United States Patent [19]

Graiver et al.

[11] Patent Number: 5,126,403

[45] Date of Patent: Jun. 30, 1992

[54] REINFORCED POLYORGANOSILOXANE ELASTOMERS

[75] Inventors: Daniel Graiver, Midland; Nedeljko V. Gvozdic, Bay City, both of Mich.

[73] Assignee: Dow Corning Corporation, Midland, Mich.

[21] Appl. No.: 628,055

[22] Filed: Dec. 17, 1990

Related U.S. Application Data

[63] Continuation-in-part of Ser. No. 559,786, Jul. 30, 1990.

[51] Int. Cl.$^5$ ............................................. C08L 29/04
[52] U.S. Cl. ........................................ 525/58; 525/61; 525/100
[58] Field of Search .......................... 525/61, 58, 100

[56] References Cited

U.S. PATENT DOCUMENTS

| | | | |
|---|---|---|---|
| 3,227,777 | 1/1966 | Safford | 260/827 |
| 4,201,698 | 5/1980 | Itoh et al. | 260/3 |
| 4,214,057 | 7/1980 | Ishihara | 525/100 |
| 4,219,591 | 10/1980 | Bunny et al. | 427/387 |
| 4,302,553 | 11/1981 | Frisch et al. | 525/28 |
| 4,423,095 | 12/1983 | Blizzard | 427/387 |
| 4,567,221 | 1/1986 | Maruyuma et al. | 524/44 |
| 4,608,187 | 8/1986 | Chang | 252/90 |
| 4,617,239 | 10/1986 | Maruyuma et al. | 428/452 |
| 4,714,739 | 12/1987 | Arkles | 525/92 |
| 4,872,867 | 10/1989 | Joh | 604/269 |
| 4,954,554 | 9/1990 | Bunge | 524/388 |

FOREIGN PATENT DOCUMENTS

| | | | |
|---|---|---|---|
| 2449085 | 4/1976 | Fed. Rep. of Germany | 525/58 |
| 38347 | 10/1978 | Japan . | |
| 54-050551 | 4/1979 | Japan | 525/58 |
| 99987 | 7/1980 | Japan . | |
| 73059 | 5/1982 | Japan . | |

*Primary Examiner*—Melvyn I. Marquis
*Assistant Examiner*—R. Dean, Jr.
*Attorney, Agent, or Firm*—Edward C. Elliott

[57] ABSTRACT

A curable polydiorganosiloxane is reinforced by mixing with a solution of polyvinylalcohol (PVA) or a modified PVA. The polydiorganosiloxane is then cured and the solvent is extracted to yield a cured polydiorganosiloxane reinforced with PVA.

8 Claims, No Drawings

REINFORCED POLYORGANOSILOXANE ELASTOMERS

This is a continuation-in-part of copending application Ser. No. 07/559,786 filed on Jul. 30, 1990.

BACKGROUND OF THE INVENTION

1. Field of the Invention

This invention relates to polydiorganosiloxane elastomers reinforced with modified polyhydroxy compounds.

2. Background Information

Useful silicone elastomers are prepared by crosslinking the linear polydiorganosiloxane after incorporating a reinforcing or extending filler into the polymer. In the absence of filler, only very weak elastomers are obtained. In order to obtain the best physical properties, reinforcing filler such as fumed or precipitated silica is used. These silica fillers have very small particle size and very large surface areas, on the order of greater than 50 square meters per gram of filler. An alternate route to obtaining useful polydiorganosiloxane elastomers is the use of linear polymers obtained from copolymerizing an organosiloxane monomer together with other non-silicone monomers or to chemically graft a non-siloxane chain onto the siloxane polymer. These alternate routes are fairly complex and are not further considered.

U.S. Pat. No. 3,227,777, issued Jan. 4, 1966, shows that attempts to blend ethylene-propylene copolymers with organosiloxane and then curing the resulting composition by an organic peroxide yielded a rather poor 30 to 45 kg/cm$^2$ tensile strength. U.S. Pat. No. 4,201,698, issued May 6, 1980, shows that when a reinforcing filler is included with such blends a tensile strength as high as 136 kg/cm$^2$ was obtained. The organopolysiloxane used had at least two functional units of either mercapto groups or aliphatic unsaturated linkages in the molecule and a specific organosilicone compound which had a polysulfide linkage and one or more silicon-bonded hydroxy groups or hydrolyzable atoms or groups in the molecule was also required to be present in the composition.

Improved mechanical properties of blends made from polyvinylalcohol (PVA) and polydiorganosiloxane are reported in Japanese applications No. 38347/78, 99987/80, and 73059/82. The improved properties are obtained only when silica filler is included as a reinforcing filler.

U.S. Pat. No. 4,219,591, issued Aug. 26, 1980, claims silylated PVA compounds effective as a coating agent for inorganic silicate substrates such as glass.

A synthetic resin having a topologically interpenetrating polymeric network characterized by a single glass transition temperature comprising at least two separate chemically dissimilar macrocyclic structures of crosslinked polymer chains which do not contain ionizable groups and which are crosslinked by different crosslinking agents which crosslink by different crosslinking mechanisms is disclosed in U.S. Pat. No. 4,302,553, issued Nov. 24, 1981. The resin is produced by a method which forms an intimate admixture of the two types of chemically dissimilar polymers and simultaneously crosslinks with polymer specific crosslinking agent polymers of the same type to each other while in intimate admixture.

Compositions of PVA, silica, and low molecular weight organic silicone compounds are taught in U.S. Pat. No. 4,567,221, issued Jan. 28, 1986, as well as in the previously mentioned Japanese applications, 38347/78, 99987/80, and 73059/82. The mixtures are suggested as defogging compounds.

PVA films toughened with a plurality of microdomains dispersed throughout the polymer are taught in U.S. Pat. No. 4,608,187, issued Aug. 26, 1986.

Chemical modification of PVA with a silylating agent is known as in U.S. Pat. No. 4,617,239, issued Oct. 14, 1986. This patent discloses a silicone containing PVA agents useful in paper coatings. One method introduces a silicone moiety into a PVA by post modification with a silylating agent or addition into a derivative of PVA that contains carboxylic groups such as partially saponified polyvinyl acetate followed by saponification of the residual acetates. Another method saponifies a copolymer of vinyl ester and silicone-containing olefinic unsaturated monomer followed by addition polymerization.

A method for producing a silicone semi-interpenetrating polymer network comprising vulcanizing a silicone component by the reaction of a polymeric silicone containing hydride groups and a non-silicone polymer containing at least one unsaturated group within a polymeric thermoplastic matrix at least partially during thermoplastic melt-processing of said silicone component and said matrix is taught in U.S. Pat. No. 4,714,739, issued Dec. 22, 1987.

An antithrombogenic material having an interpenetrating polymer network comprising a polyether type polyurethane or polyurethane urea, a water soluble polymer, and a room temperature cross-linking type silane coupling agent capable of being activated by water and which crosslinks to form a hydrophobic highly crosslinked polysiloxane network is taught in U.S. Pat. No. 4,872,867, issued Oct. 10, 1989.

SUMMARY OF THE INVENTION

A polydiorganosiloxane elastomer reinforced with polyvinylalcohol (PVA) is produced by dissolving fully hydrolyzed PVA in solvent, then mixing the solution containing the PVA into a curable polydiorganosiloxane and curing the polydiorganosiloxane to give an elastomer, and finally removing the solvent used in the preparation of the PVA solution.

The process of this invention results in a cured silicone elastomer which is reinforced with PVA. This type of reinforcement can be used to provide silicone elastomers which have good physical properties, but do not contain particulate fillers. Elastomers without particulate fillers are desirable in medical applications

DESCRIPTION OF THE INVENTION

This invention relates to a method of producing a polydiorganosiloxane reinforced with a polyvinylalcohol (PVA) comprising preparing a PVA solution by dissolving up to 30 percent by weight of fully hydrolyzed PVA having a molecular weight of greater than 10,000 in an organic solvent capable of dissolving or swelling the PVA and not reacting with polydiorganosiloxane (B) or crosslinking agent (C), based upon the weight of PVA and solvent; adding the PVA solution to a curable polydiorganosiloxane and mixing to give a uniform mixture; then adding a crosslinking agent, if necessary, to cure the polydiorganosiloxane and then curing the polydiorganosiloxane; then extracting the solvent from the mixture; to give a cured polydiorganosiloxane reinforced by the PVA.

In the absence of reinforcing agents, silicone elastomers have poor physical properties such as tensile strength and elongation. Through the use of reinforcing agents, such as fume silica, it is possible to produce silicone elastomers having tensile strengths of 1000 psi and higher and elongations at break of 1000 percent or greater. The silanol groups on the polydiorganosiloxane are thought to react with hydroxyl groups of the surface of the silica to give an interaction which leads to enhanced physical properties of the silicone elastomer.

An alternative route to obtaining useful polydiorganosiloxane elastomers has been to use copolymers of silicone and non-silicone polymers or to chemically graft a non-siloxane chain onto a siloxane polymer. These alternative routes to better physical properties are fairly complex and expensive.

Blends of polydiorganosiloxane with other synthetic organic rubber is very difficult and does not produce the synergistic combination of properties desired from such blends as is shown in the above referenced U.S. Pat. No. 3,227,777. Better results are obtained when used in conjunction with silica filler as taught in U.S. Pat. No. 4,201,698.

When blends are made with amounts of PVA such as 5 weight percent, there is a low amount of reinforcement of the cured polydiorganosiloxane. When blends are made with amounts of PVA such as 60 weight percent, there is high reinforcement of the cured polydiorganosiloxane when the solvent used to form the PVA solution used is a good solvent for both the PVA and the polydiorganosiloxane. When the solvent used for making the PVA solution or for replacing the original solution in the process is not a good solvent for the polydiorganosiloxane, the polydiorganosiloxane is no longer an elastomer, but has plastic-like properties. The PVA forms the continuous phase and the polydiorganosiloxane becomes the discontinuous phase, resulting in a plasticized PVA. High amounts of PVA, such as 70 weight percent give compositions which have high tensile strength and low elongation.

The PVA used in this invention can be any of the commercially available grades which are available. The grades vary in molecular weight from as low as about 10,000 to as high as about 115,000. The PVA is preferably fully hydrolyzed with less than 2 percent residual carboxylate moieties left in the polymer. It is further preferred to use PVA which has less than 1 percent residual carboxylate groups if high mechanical strength is desired. The amount of branching, 1,2 glycol linkages, and the stereoregularity of the PVA does not seem to affect the compatibility or the mechanical strength of the blend as much as does the molecular weight and the degree of hydrolysis.

The PVA is first dissolved in an organic solvent such as dimethylsulfoxide (DMSO). Suitable solvents are those which will dissolve the PVA or swell it to a large degree but which will not react with the polydiorganosiloxane. Suitable solvents include dimethylsulfoxide, ethylene glycol, glycerol, dimethyl formamide, and pyridine. Solution concentrations up to about 20 percent by weight can be obtained by simply heating the mixture of PVA and solvent at about 100° C. for 2 to 5 hours. Solution concentrations higher than about 20 percent are more difficult to make in that they must be heated at higher temperatures or in an autoclave for long periods of time, 2 weeks for example. It is possible to make solutions at concentrations of up to 30 percent by this technique. It is preferred to solubilize the PVA in the solvent under an inert atmosphere such as nitrogen to minimize the degradation of the PVA during heating. The viscosity of the solution will depend upon the concentration of PVA, the molecular weight of the PVA, and the degree of hydrolysis. Highest viscosity is obtained when high concentration, high molecular weight, and high degree of hydrolysis polymer is used. Water is not a suitable solvent for use in this method as it prevents the use of any of the moisture activated curing systems used with polydiorganosiloxane.

The curable polydiorganosiloxane can be any linear alkyl or aryl polydiorganosiloxane with functional groups either at the ends of the polymer chains or distributed along the chains. The functional groups can be any group which will react with itself or a crosslinking agent to give an elastomeric network. Preferred groups are silanols, alkoxy, and carboxyl groups. The curable polydiorganosiloxane may also include a crosslinking agent having greater than two reactive groups which will react with the functional groups on the polydiorganosiloxane, such as an alkyltrialkoxysilane, alkyltricarboxylsilane, alkyltrioximosilane, alkyltriketoximosilane, alkyltriaminoxysilane, alkyltriaminosilane, and alkyltriphosphatosilane. Any combination of functional polydiorganosiloxane and reactive crosslinking agent, together with a catalyst such as tin salt of carboxylic acid if needed, may be used. These curable polydiorganosiloxane systems are well known in the art.

The PVA in solution is mixed under mild conditions with the curable polydiorganosiloxane to obtain a uniform mixture. The curable polydiorganosiloxane is then crosslinked by whatever method has been chosen. The crosslinking reaction prevents a gross phase separation of the two polymers from the solvent blend upon the subsequent step of extracting the solvent. After the polydiorganosiloxane is crosslinked, the solvent used to dissolve the PVA is removed. If a low boiling point solvent has been used, it can be removed by evaporation or heating and evaporation. If a high boiling point solvent, such as dimethylsulfoxide (DMSO), has been used, it is preferably first extracted by immersing the cured blend in a large excess of another solvent with a low boiling point, then removing the low boiling point solvent by evaporation.

When the solvent has been removed, the product is a cured polydiorganosiloxane which is reinforced by the PVA. This product can be particularly useful in medical articles since it does not contain resinous filler.

The PVA can be modified before mixing with the polydiorganosiloxane by reacting with a silylating agent of the formula $R''_b(R'_2SiO)_n SiR_a X_{3-a}$ or of the formula $R''_b SiR_a X_{4-a-b}$ where R is a group capable of undergoing hydrolysis to form a siloxane bond with the curable polydiorganosiloxane of step (B), R' is a monovalent alkyl or aryl radical having from 1 to 6 carbon atoms, optionally halogen substituted, and compatible with the curable polydiorganosiloxane of step (B), R" is either R or R', X is a radical reactive with the hydroxyl on the PVA, a in an integer of 1, 2, or 3, b is an integer of 0, 1, or 2, the sum of a plus b is from 1 to 3 inclusive, and n is from 1 to 35, with the proviso that X must be present. The function of R in the silylating agent is to provide bonding to the curable polydiorganosiloxane of step (B) by undergoing hydrolysis and then reaction with the polydiorganosiloxane. Preferred R groups are alkoxy, aryloxy, and carboxy radicals having from 1 to 6 carbon atoms. Preferred R groups include methoxy, ethoxy, phenoxy, and acetoxy. The R' radical is selected to enhance the compatibility of the modified PVA with the silicone matrix. R' should be similar to the radicals of the polydiorganosiloxane. For example, if the modified PVA is going to be used to reinforce a polydimethylsiloxane, then R' would preferably be a methyl radical. If the modified PVA is going to be used to reinforce a fluorosiloxane, then R' would preferably be 1,1,1-trifluoropropyl radical. R' is less than 6 carbon atoms to maintain the siloxane nature and eliminate crystallization of this alkyl group. R" is selected from either R or R'. If R" is selected from R, then the silylating agent is capable of undergoing hydrolysis to form a siloxane bond with the curable polydiorganosiloxane. If R" is selected from R', then the silylating agent is compatible with the curable polydiorganosiloxane. X is a radical which is reactive with the hydroxyl group on the PVA. X is selected from the group consisting of hydrogen, hydroxyl radical, esters having the formula $-CO_2R^1$, alkoxy radicals having the formula $-OR^1$, primary and secondary amines having the formula $-R^1NH_2$ and $-R^1R^2NH$, ether amines having the formula $-R^2ONH_2$, isocyanester having the formula $-R^1NCO$, primary nitrile radicals having the formula $-R^2C\equiv N$, primary sulfanyl radicals having the formula $-R^1SH$, and monoperoxide radicals selected from epoxy alkyl, epoxy oxyalkyl, epoxy dicyclicalkyl, and epoxy dicyclic radicals; where $R^1$, $R^2$ and said alkyl radicals are individually selected from saturated alkyl radicals having 1 to 6 carbon atoms and $R^2$ is further selected from cycloalkyl, aryl, and alkaryl radicals containing 6 to 10 carbon atoms. When a is an integer of from 1 to 3, it means that the silylating agent has at least one group present which is capable with reacting with the secondary alcohol on the PVA to produce grafts with relatively stable bonds. This also means there is at least one group capable of reacting with the silicone matrix to form a siloxane bond. The silylating agent can be a silane when n is zero or a siloxane when n is greater than zero. The upper limit of n is though to be about 35 in order to ensure that the silylating agent is soluble in the PVA/solvent of (1).

It is preferred that the reactivity of R with the secondary alcohols of the PVA be less than the reactivity of X. Proper choice of the silylating agent and the reaction conditions will prevent premature crosslinking and difficulties in subsequent processing. The functional group X that is to react with the hydroxyl groups on the PVA should be much more reactive than the group R on the silane which may also be reactive with the same hydroxyl groups. This difference in reactivity is required to minimize undesirable side reactions that will lead to premature gelation. For example, if X in an epoxy group and R are methoxy radicals, then X is much more reactive toward the hydroxyl groups on the PVA as compared to the equilibration reaction of the methoxy groups and the hydroxyl groups on the PVA. If a silane was chosen, for example, where the X radical was epoxy and the R radicals were chlorides, then the higher reactivity of the chloride radicals would lead to a gelled product. Examples of silylating agents include organohalogenosilanes such as gamma-glycidoxypropyl-1,1,1-trifluoropropyldimethoxysilane, dialkylcarboxysilane such as gamma-glycidoxypropyldimethylacetoxysilane, and organoalkoxysilanes such as gamma-glycidcyanopropyltriethoxysilane.

The following examples are included for illustrative purposes only and should not be construed as limiting the invention which is properly set forth in the appended claims.

EXAMPLE 1

A composition was prepared by mixing 67 g of PVA as an 18 percent solution of PVA in dimethylsulfoxide (DMSO), the PVA having a medium molecular weight and more than 88 mole percent hydrolysed groups, supplied by E. I. duPont de Nemours & Co. Inc., 42 g of hydroxyl endblocked polydimethylsiloxane (PDMS) having a molecular weight of about 30,000, and 7.5 g of methyltrioximosilane (MTO) in a dental mixer under high shear for 2 minutes. Then 0.5 g of dibutyltindilaurate was added and mixing continued for 30 seconds. The blend was immediately cast into a 3 mm thick slab and allowed to cure at room temperature for about 3 weeks. After the blend was cured, the cured slab was immersed in toluene for 8 hours to allow displacement of the DMSO with toluene. The toluene was then completely removed by placing in a vacuum oven at 80° C. The cured sheet, consisting of 62 percent PVA and 38 percent polydimethylsiloxane, was cut into test samples and measured for physical properties in accordance with ASTM D 412. The tensile strength was 1250 psi, the elongation at break was 430 percent, and the initial modulus was 1,600 psi.

EXAMPLE 2

The procedure of Example 1 was repeated, except the DMSO was displaced with acetone and the acetone was removed by placing in an exhaust hood with full air flow until the acetone had completely evaporated. When tested, the tensile strength was 100 psi, the elongation was 5 percent, and the initial modulus was 1,000 psi.

EXAMPLE 3

The procedure of Example 1 was repeated, except 11.5 g of PVA, 270 g of PDMS, 7.0 g of MTO, and 0.5 g of dibutyltindilaurate was used. The cured slab, with a PVA content of 4 percent and a PDMS content of 96 percent, had a tensile strength of 200 psi and an elongation of 350 percent.

COMPARATIVE EXAMPLE 4

A blend was prepared by mixing 5.25 gm of PVA as a 25 percent solution of PVA in water, having a medium molecular weight and more than 88 mole percent hydrolyzed groups, and 505 g of the PDMS of Example 1 in an Eppenbach mixer for 20 minutes. The water was removed from 107 g of this mixture by placing in a vacuum oven at room temperature. Then 8 g of MTO were added and mixed for 1 minute, 0.45 of dibutyltindiacetate was admixed for 30 seconds and the blend was cast into a 2 mm thick slab and allowed to cure for 3 weeks, to give a composition having 1 percent PVA and 99 percent PDMS. The tensile strength was 80 psi and the elongation was 350 percent.

COMPARATIVE EXAMPLE 5

A composition was prepared by mixing 6.5 g of PVA having particle sizes of from 50 to 500 microns, 106 g of PDMS, and 7 g of MTO in a dental mixer for 2 minutes. Then 0.4 g of 2,5-di-isopropoxy-bis-ethylacetoacetate titanium was admixed for 30 seconds and the composition cast into a 3 mm thick slab and allowed to cure for 3 weeks to give a slab of 6 percent PVA and 94 percent PDMS. The tensile strength was 80 psi and the elongation was 350 percent.

COMPARATIVE EXAMPLE 6

A composition was prepared by mixing 30 g of commercially available PVA powder that was at least 99 percent hydrolyzed, obtained from E. I. DuPont, 250 g of PDMS, and 9 g of MTO for 2 minutes, then adding 0.5 g of dibutyltindilaurate and mixing for 30 seconds. The composition was cast into a 3 mm thick slab and cured for 3 weeks. The tensile strength was 80 psi and the elongation was 350 percent.

Comparative examples 4, 5, and 6 show that the PVA did not provide any reinforcement for the PDMS.

EXAMPLE 7

A blend was prepared by combining 96 g of a 30 percent PVA in DMSO solution, 5 g of PDMS having a molecular weight of about 60,000, and 5 g of MTO in a dental mixer and mixing for 2 minutes. The 0.5 g of dibutyltindilaurate was admixed for 30 seconds and the blend cast into a sheet of 2 mm thickness and allowed to cure for 3 weeks. After cure the DMSO was replaced with toluene and the toluene removed from the sheet by placing in an exhaust hood at room temperature until the toluene was completely evaporated to give a sheet of 95 percent PVA and 5 percent PDMS. The tensile strength was 3200 psi, the elongation was 240 percent, and the initial modulus was 11,000 psi.

EXAMPLE 8

The procedure of Example 7 was followed but using 40 g of PVA, 25 g of a PDMS having a molecular weight of 30,000, 8 g of MTO and 0.25 of dibutyltindilaurate to give a sheet having 57 percent PVA and 43 percent PDMS. The tensile strength was 1250 psi, the elongation was 220 percent, and the initial modulus was 4,100 psi.

EXAMPLE 9

The procedure of Example 8 was followed, but using 40 gm of PVA and 10 g of PDMS to give a blend of 70 percent PVA and 30 percent PDMS. The tensile strength was 2150 psi, the elongation was 170 percent, and the initial modulus was 6500 psi.

The following examples show the use of a silyl modified PVA.

EXAMPLE 10

A solution of PVA was prepared by mixing 20 g of PVA having a molecular weight of about 89,000 and more than 99.5 mole percent hydrolysed groups (less than 0.5 mole percent carboxylate moieties) with 100 g of dimethylsulfoxide (DMSO) in a three-necked flask equipped with a mechanical stirrer, thermometer, and a reflux condenser. The mixture was heated to 110° C. under a nitrogen atmosphere and stirred until all the PVA was dissolved. The solution was then allowed to cool to 60° C. and 4.5 g of gamma-glycidoxypropyltrimethoxysilane was added dropwise. Some increase in viscosity was noticeable after the addition of the silane, but the solution remained flowable.

A blend of the modified PVA above with a polydiorganosiloxane was prepared by combining 10 g of the modified PVA, 18 g of hydroxyl endblocked polydimethylsiloxane having a molecular weight of about 60,000, and 2.5 g of methyltrimethoxysilane in a sealed mixer. The mixture was stirred for 20 minutes until uniform, then 0.5 g of dibutyltindilaurate condensation catalyst was added and stirring continued for 3 minutes. The catalyzed blend was then cast into a 1.5 mm thick sheet and allowed to cure in the presence of atmospheric moisture for 3 days. The cured sheet was placed in hexane to extract the DMSO, followed by removing the hexane in a vacuum oven at 80° C. The final test sheet was cut into test samples and measured for physical properties in accordance with ASTM D 412. The tensile strength was 625 psi, the elongation at break was 580 percent, the initial modulus was 350 psi, and the toughness was 2,050 psi. Toughness is defined here as the integrated area under the stress-strain curve.

EXAMPLE 11

The procedure of example 10 was repeated, using 10 g of the modified PVA and 12 g of the polydimethylsiloxane. The physical properties are shown in Table 1.

EXAMPLE 12

The procedure of example 10 was repeated, using 10 g of the modified PVA and 8 g of the polydimethylsiloxane. The physical properties are shown in Table 1.

EXAMPLE 13

This example does not contain a crosslink agent other than the methoxy functional groups on the silylating agent which are attached to the modified PVA.

A blend was prepared from 10 g of the modified PVA of example 10, 30 g of the polydimethylsiloxane of example 10 and 0.5 g of dibutyltindilaurate by mixing together for 15 minutes in the absence of moisture. The blend was then cast into a 1.5 mm sheet and allowed to cure for 1 week in the presence of moisture. At that time, a noticeable crosslinking had taken place and the sheet was placed in hexane, then placed into a hood with maximum airflow and dried. After solvent removal, 26 g of the polydimethylsiloxane had been extracted. This 26 g of polydimethylsiloxane was not crosslinked by the silylated PVA, but 4 grams of the polydimethylsiloxane was crosslinked by the silylated PVA. The properties of the sheet were measured as in example 10, with the results shown in Table I.

COMPARATIVE EXAMPLE A

A mixture of 100 g of the polydimethylsiloxane of example 10 and 5 g of methyltrimethoxysilane was mixed for 5 minutes in the absence of moisture, then 0.5 g of dibutyltindilaurate was mixed in for 1 minute. The uniformly mixed sample was then cast into a sheet, allowed to cure for 2 weeks and then tested as in example 10 with the results shown in Table I.

COMPARATIVE EXAMPLE B

The partially silylated PVA from example 10 was cast onto a Teflon sheet. After 30 minutes, the sheet was submerged in a bath of acetone to extract the DMSO from the polymer. The acetone was then removed by placing the sheet in a hood under maximum air flow for 1 day. The obtained sheet was brittle, almost like the original, unmodified PVA.

TABLE I

| Example | PVA Wt. % | Tensile Strength psi | Ultimate Elongation percent | Initial Modulus psi | Toughness psi |
| --- | --- | --- | --- | --- | --- |
| A | 0 | 80 | 340 | 540 | — |

TABLE I-continued

| Example | PVA Wt % | Tensile Strength psi | Ultimate Elongation percent | Initial Modulus psi | Toughness psi |
|---|---|---|---|---|---|
| 1* | 100 | Brittle, properties not measured | | | |
| 10 | 35 | 625 | 580 | 350 | 2,050 |
| 11 | 45 | 1040 | 440 | 1200 | 2,850 |
| 12 | 55 | 900 | 290 | 3000 | 1,900 |
| 13 | 72 | 3800 | 130 | 4706 | — |

That which is claimed is:

1. A method of producing a polydiorganosiloxane reinforced with polyvinylalcohol comprising
   (A) preparing a polyvinylalcohol solution by dissolving up to 30 percent by weight of partially or fully hydrolyzed polyvinylalcohol having a molecular weight of greater than 10,000 in an organic solvent capable of dissolving or swelling the polyvinylalcohol and not reacting with polydiorganosiloxane (B) or crosslinking agent (C), based upon the weight of polyvinylalcohol and solvent,
   (B) adding the polyvinylalcohol solution to a curable polydiorganosiloxane and mixing to give a uniform mixture, then
   (C) adding a crosslinking agent, if necessary, to cure the polydiorganosiloxane and then curing the polydiorganosiloxane, then
   (D) extracting the solvent from the mixture, to give a cured polydiorganosiloxane reinforced by the polyvinylalcohol.

2. The method of claim 1 in which the fully hydrolyzed polyvinylalcohol has less than 2 percent residual carboxylate moieties.

3. The method of claim 2 in which the fully hydrolyzed polyvinylalcohol has less than 1 percent residual carboxylate moieties.

4. The method of claim 1 in which the curable polydiorganosiloxane is a hydroxyl endblocked polydiorganosiloxane.

5. The method of claim 4 in which the crosslinker is an alkyltrialkoxysilane where the alkyl radical has from 1 to 6 carbon atoms and the alkoxy radical has from 1 to 6 carbon atoms.

6. The method of claim 5 in which the fully hydrolyzed polyvinylalcohol has less than 1 percent residual carboxylate moieties and the organic solvent is dimethylsulfoxide.

7. The composition produced by the method of claim 1.

8. The composition produced by the method of claim 6.

* * * * *